May 13, 1969  W. F. CARLIN III, ETAL  3,443,428
FUEL CONTROL TESTING DEVICE
Filed Oct. 3, 1966 Sheet _1_ of 3
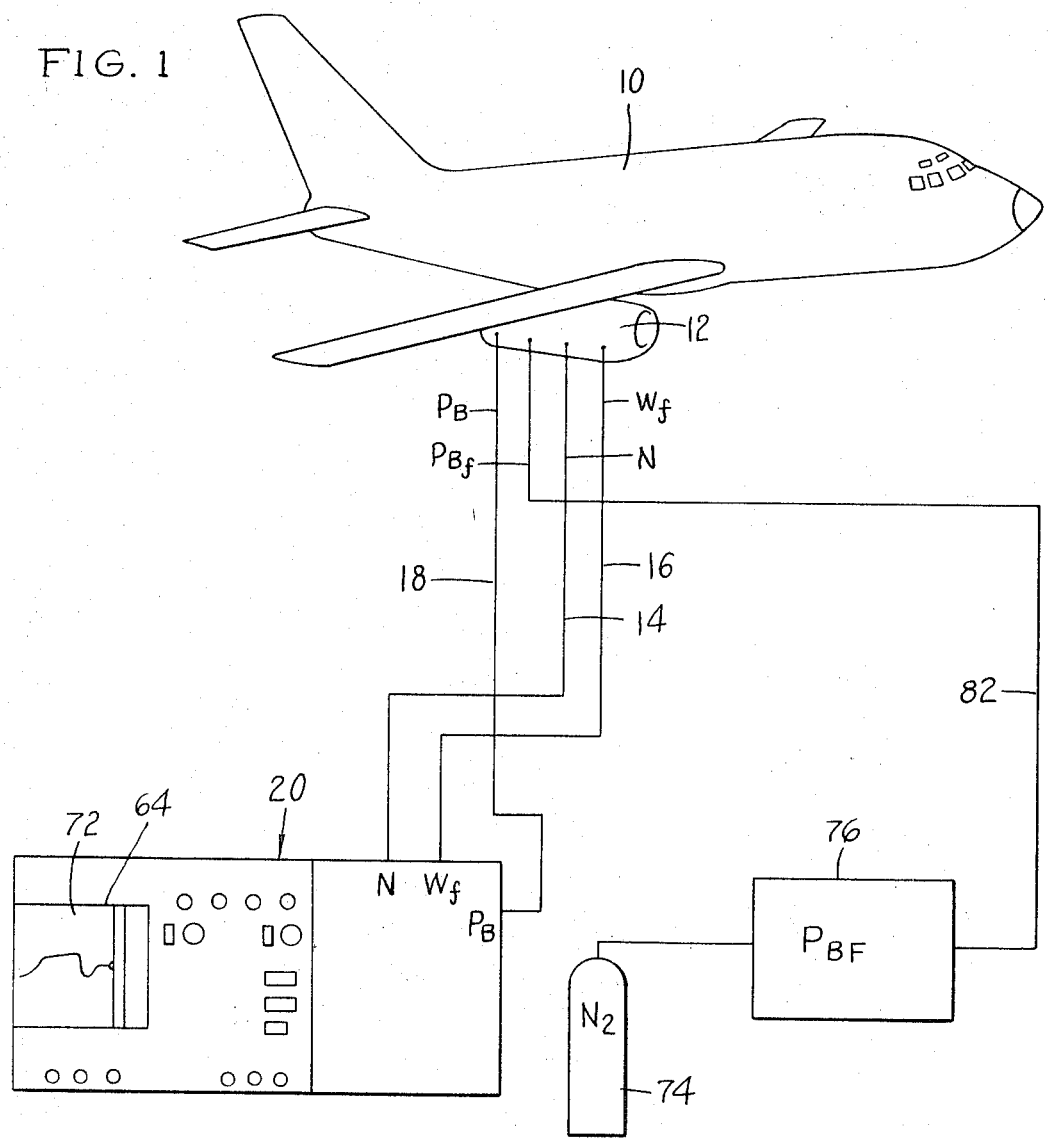
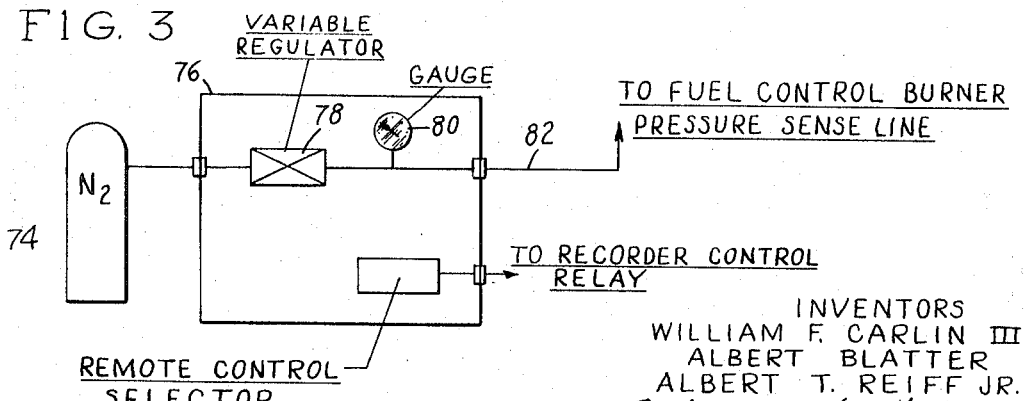
INVENTORS
WILLIAM F. CARLIN III
ALBERT BLATTER
ALBERT T. REIFF JR.
BY Fishman & Van Kirk
ATTORNEYS

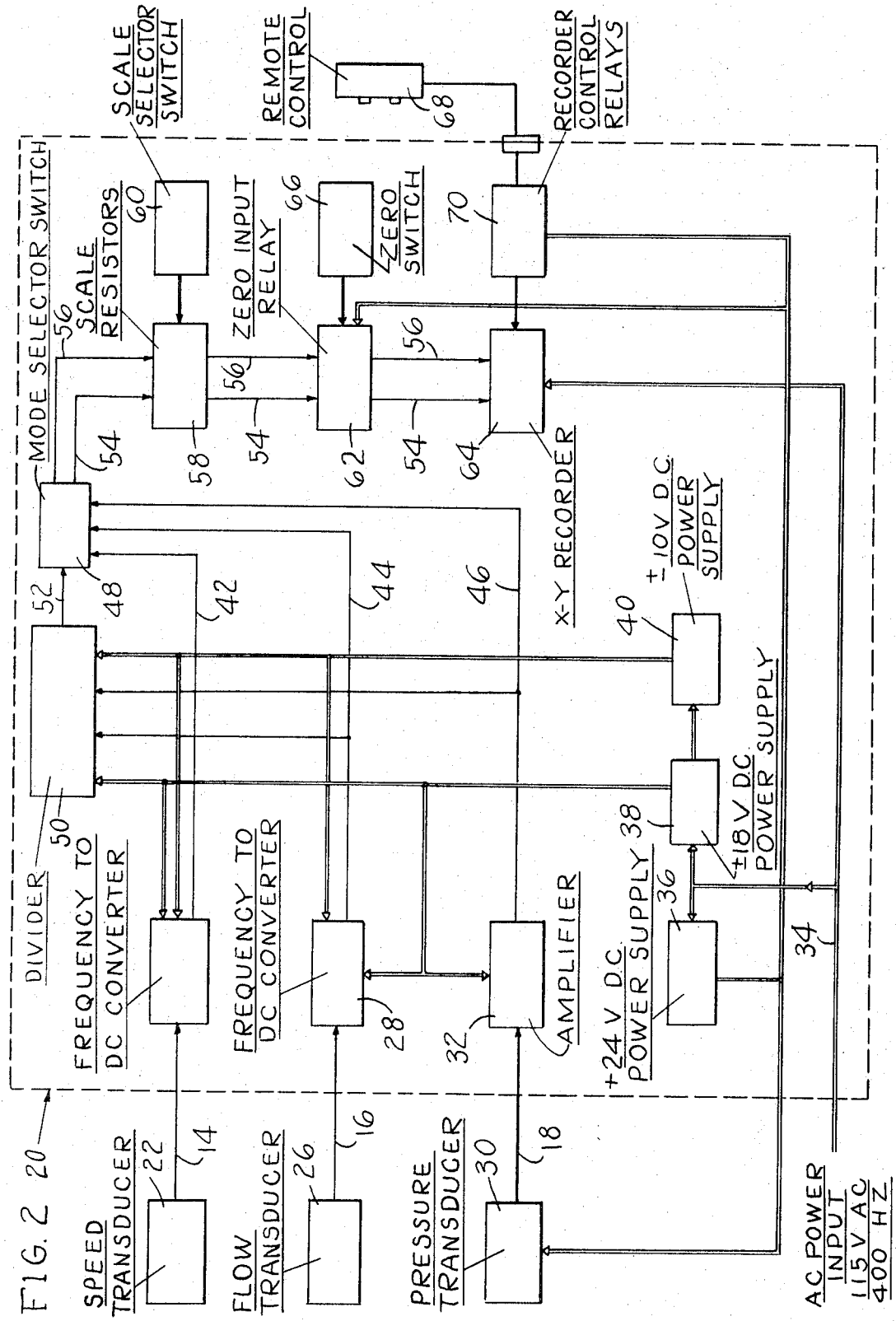

3,443,428
FUEL CONTROL TESTING DEVICE
William F. Carlin III, Springfield, Mass., and Albert Blatter, Bloomfield, and Albert T. Reiff, Jr., Simsbury, Conn., assignors to United Aircraft Corporation, East Hartford, Conn., a corporation of Delaware
Filed Oct. 3, 1966, Ser. No. 583,595
Int. Cl. G01l *19/00*
U.S. Cl. 73—117.3       14 Claims

ABSTRACT OF THE DISCLOSURE

A means for monitoring the performance of a gas turbine engine fuel control to determine the effects of fuel control performance on related engine system conditions.

---

This invention relates to a monitoring device for testing gas turbine engine fuel controls. More particularly, this invention relates to a portable testing device for investigating the performance capabilities and operating condition of a gas turbine engine fuel control without removing the fuel control from its engine installation.

In the past when a pilot has reported a suspected malfunctioning of a gas turbine engine fuel control, it has been necessary to remove the fuel control from its engine installation if it was desired to analyze the operation condition of the fuel control. Moreover, the necessary equipment to check the operating condition of a gas turbine engine fuel control has been expensive and too large to be of portable nature, and the practice heretofore has been to ship a suspected malfunctioning fuel control to a central maintenance depot for testing and overhaul if necessary.

This previous practice has resulted in a considerable waste of effort and money because it was often eventually determined that the fuel control was operating properly and that the trouble resided elsewhere than in the suspect fuel control. For example, the trouble attributed to the fuel control might have been the result of repeated pilot error in attempting to obtain performance beyond the capabilities of the fuel control and/or the engine; or merely from the pilot's unfamiliarity with the type of engine or fuel control involved; or from false readings resulting from malfunctioning engine sensors; or from malfunctioning cockpit indicator meters. In other words, properly functioning fuel controls have been unnecessarily removed many times because of the existence of problems that have been incorrectly attributed to malfunctioning of the fuel control.

The present invention eliminates the premature removal of fuel controls from their engine installations by providing apparatus for determining the operating condition of a gas turbine engine fuel control while the fuel control is installed in its normal engine installation. In the present invention the gas turbine engine operating parameters of engine speed, engine burner pressure, and fuel flow to the engine (fuel flow being specifically considered herein as an engine operating parameter) are sensed and are selectively applied as inputs to an analyzer including an X–Y plotter recording unit. By proper selection of the inputs to the X–Y plotter, charts are obtained which are permanent records of test data of both the operating condition of the fuel control and the inter-relationship between or the effect of the fuel control on other components or conditions of the power plant system. These charts can then be compared with standard data of theoretical proper performance to determine whether the fuel control is functioning properly. The effect of fuel control performance on several engine system conditions can be readily analyzed while the control remains on the aircraft; e.g., slow acceleration, hung starts, engine flameout, incorrect power level and some cases of instability. Also, the invention eliminates previous time consuming trial and error maintenance procedures in identifying specific areas of discrepancies in power plant system operation, such as acceleration schedule, temperature or pressure compensation, deceleration schedule, minimum flow, governor, engine bleed valves, exhaust nozzle area, power lever, and others. The apparatus associated with these areas of engine operation can be operated or cycled, and the resulting charts of fuel control performance can then be compared with standard data to determine whether there is proper performance in these areas.

As an optional feature, the present invention may also provide for the generation of a false burner pressure signal which is employed to permit operation and dwelling on the acceleration limit line and the deceleration limit line.

The size of the equipment employed in the present invention is also of significance. The basic equipment is completely contained within a portable package which is in the nature of a large suitcase type unit. The equipment for generation of the optional false burner pressure signal is, except for a gas supply such as pressurized nitrogen or compressed air, contained in a second portable suitcase type unit. All necessary hookups between the engine and the test equipment can be easily made with common hand tools.

Accordingly, one object of the present invention is to provide novel testing apparatus for monitoring the performance of a gas turbine engine fuel control.

Another object of the present invention is to provide novel testing apparatus for monitoring the performance of a gas turbine engine fuel control without removing the fuel control from its engine installation.

Still another object of the present invention is to provide novel testing apparatus for monitoring the performance of a gas turbine engine fuel control to determine the effects of fuel control performance on related engine system conditions.

Still another object of the present invention is to provide novel test apparatus for monitoring the performance of a gas turbine engine fuel control to identify discrepancies in power plant system operation by specific area.

Still another object of the present invention is to provide novel test apparatus of small size and which is easily connectible for monitoring the performance of a gas turbine engine fuel control without removing the control from its engine installation.

Still another object of the present invention is to provide novel test apparatus for monitoring the performance of a gas turbine engine fuel control by providing a false indication of engine burner pressure to allow operation and monitoring of the fuel control on the acceleration and deceleration limit lines.

Other objects and advantages of the present invention will be apparent from the following detailed description and drawings.

3

In the drawings wherein like elements are numbered alike:

FIGURE 1 is a schematic representation showing the test apparatus of the present invention connected to a gas turbine engine for monitoring performance of the gas turbine engine fuel control.

FIGURE 2 is a block diagram showing test apparatus of the present invention.

FIGURE 3 is a schematic showing of apparatus for generating the false burner pressure signal for use in the present invention.

Figure 4:
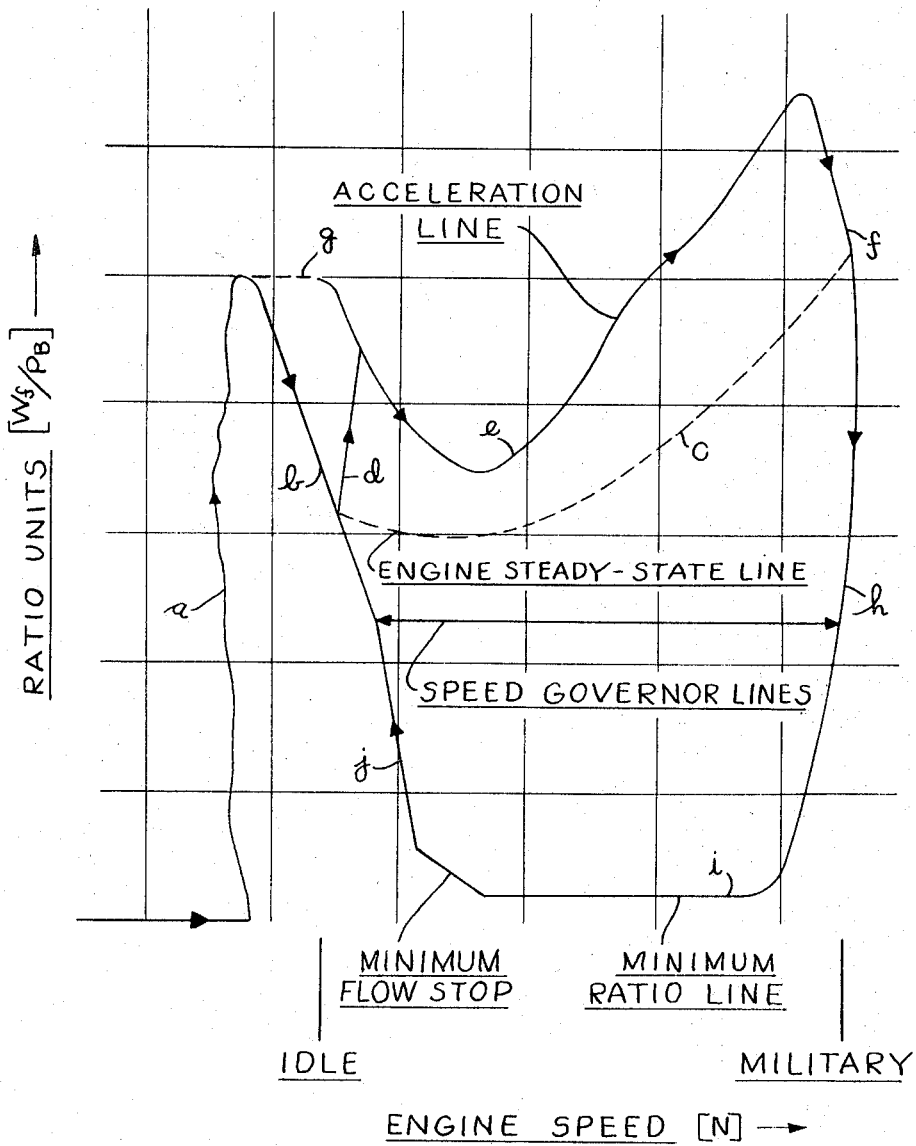
FIGURE 4 is a showing of representative plots or charts of fuel control performance obtainable with the apparatus of the present invention.

Referring now to FIGURE 1, an airplane 10 is shown having a jet engine 12. An electrical conductor or cable 14 carries a signal commensurate with combustion chamber pressure or burner pressure $P_b$ of engine 12; an electrical conductor or cable 16 carries a signal commensurate with the rotating speed N of the compressor of engine 12; and an electrical conductor or cable 18 carries a signal commensurate with the weight of fuel flow $W_f$ metered by the fuel control for engine 12. Burner pressure $P_b$, compressor speed N, and fuel flow $W_f$ will all hereinafter be referred to and considered as operating parameters of engine 12. Electrical signal conductor lines 14, 16 and 18 extend from appropriate sensors in engine 12 to a suitcase type unit 20.

Referring now to FIGURE 2, signal line 14 connects a speed transducer 22 to an A.C. to D.C. converter 24; signal line 16 connects a flow transducer 26 to another A.C. to D.C. converter 28; and signal line 18 connects a pressure transducer 30 to an amplifier 32. Speed transducer 22 may be a standard engine mounted speed sensor in engine 12 which normally provides information to the cockpit and/or the fuel control. Flow transducer 26 and pressure transducer 30 are accessories supplied with suitcase unit 20.

Speed transducer 22 is typically a standard engine speed sensor such as a tap off the tachometer of engine 12. The output from speed transducer 22 is an A.C. signal which is converted to a D.C. signal in converter 24. Flow transducer 26 is typically a turbine wheel flow sensor placed in the fuel line from the fuel control to the engine burner section. Transducer 26 also generates an A.C. signal which is delivered via line 16 through converter 28 and is converted to a D.C. signal. Pressure transducer 30 is typically an instrument such as a variable reluctance or a strain gage type of device which is connected to sense the burner pressure signal in the fuel control and deliver a D.C. signal via signal line 18 to amplifier 32.

An A.C. power input cable 34 delivers 115 volt A.C. at 400 cycles, either from the aircraft itself or from an external source, to regulated power supplies 36 and 38. Regulated power supply 36 provides 24 volts D.C. to transducer 30, and regulated power supply 38 provides 18 volts D.C. to amplifier 32, converter 28, and converter 24. Regulated power supply 38 also supplies regulated power supply 40 which in turn has a regulated D.C. output of ±10 volts.

Signal lines 42, 44 and 46 connect the outputs from converters 24 and 28 and amplifier 32, respectively, to a mode selector switch 48. The signal carried by line 42 is commensurate with the engine operating parameter of engine speed, the signal carried by line 44 is commensurate with the engine operating parameter of fuel flow, and the signal carried by line 46 is commensurate with the engine operating parameter of burner pressure. The signal of fuel flow $W_f$ carried by line 44 and the signal of burner pressure $P_b$ carried by line 46 are also both delivered to a divider 50 (for example, an analog divider function module such as Consolidated Electrodynamics Corporation part No. 19–302) which receives power inputs from regulated power supplies 38 and 40. Divider 50 generates an output signal commensurate with the ratio of fuel flow to burner pressure $W_f/P_b$, a parameter known in the art as "ratio units." This ratio units signal, $W_f/P_b$, is carried via an electrical conductor signal line 52 to mode selector switch 48.

Mode selector switch 48 is a single pole, six position, two deck switch. The input signals on lines 42, 44, 46 and 52 are all delivered to the first deck of the switch; the signal of fuel flow $W_f$ on line 44 being delivered to first and second positions on the first deck, the signal of burner pressure $P_b$ on line 46 being delivered to third and fourth positions on the first deck, the signal of engine speed N on line 42 being delivered to a fifth position on the first deck, and the signal of ratio units $W_f/P_b$ on line 52 being delivered to a sixth position on the first deck. The six positions on the first deck are each connectable in a predetermined order to an electrical conductor signal line 54 as mode selector switch 48 is rotated so that any of the individual inputs on lines 42, 44, 46 and 52 can be made to appear on line 54. Only three positions on the second deck of switch 48 are connected to receive inputs, and those three positions are each connected to receive the signal of engine speed N on line 42. These three positions on the second deck of switch 48 are connected to an electrical conductor signal line 56 so that the parameter engine speed N can be selectively delivered to signal line 56 by the actuation of mode selector switch 48. The other three positions on this second deck are blank so that inputs to the corresponding positions on the first deck can be coordinated with a time signal. The two decks of switch 48 are coordinated so that the speed signal N appears on line 56 when the switch is positioned to deliver the $W_f/P_b$ signal or one of the $W_f$ signals or one of the $P_b$ signals to line 54; and no signal appears on line 56 when the N signal or other $W_f$ or $P_b$ signal is on line 54.

The signals on lines 54 and 56 are each delivered to a scale resistor unit 58 which can be selectively actuated by scale selector switch 60 to vary the levels of any signals present on lines 54 and 56 to keep those signals within a predetermined scale. Signal lines 54 and 56 continue from scale resistor unit 58 to a zero input relay unit 62 and thence to an X–Y recorder 64 such as model No. 680 presently available from Data Equipment Company.

Zero input relay unit 62 is used to reset recorder 64 for a new plotting after a plot has been made. When zero input relay unit 62 receives actuation signals from switch 66, relay unit 62 functions to isolate X–Y recorder 64 from the signals on lines 54 and 56 at the input to relay unit 62 and to also short out the input terminals on recorder unit 64 to return both the X and Y settings on recorder 64 to the zero position for recycling. A new sheet of paper can then be set for the next plot.

A remote control unit 68 is connected to a recorder control relay unit 70 which is in turn connected to recorder 64. Recorder 64 can be set by a switch on the recorder unit to operate either in an X–Y mode or a TIME mode. The actuation of switches on remote control unit 68 operates through the opening and closing of contacts in relay unit 70 to operate recorder 64. When recorder 64 is in its X–Y mode of operation, actuation of a first switch on remote control unit 68 sets the pen of recorder 64 to the paper for recording in accordance with the two inputs on lines 54 and 56. Actuation of a second switch on remote control unit 64 will lift the pen after a recording has been made to allow resetting for a new plot. When recorder 64 is in its TIME mode of operation, actuation of the first switch on remote control unit 68 sets the pen to the paper to sweep on a time basis against the single input to the recorder on line 54. The pen can be removed from the paper by actuation of the second switch.

When it is desired to obtain a plot of either ratio units $W_f/P_b$ or fuel flow $W_f$ or engine burner pressure $P_b$ against engine speed N, mode selector switch 48 is moved to the appropriate position so that the desired input $W_f/P_b$ or $W_f$ or $P_b$ appears on line 54 and engine speed N appears on line 56. The signals on lines 54 and 56 are delivered through scale resistor unit 58 and zero input relay unit 62 to X–Y recorder 64, and a chart 72 (see FIGURE 1) will be produced on X–Y recorder 64 commensurate with a plot of the signal on line 54 against the signal on line 56. Since the signals on lines 54 and 56 are commensurate with the actual operating characteristics of the engine fuel control and the operating signals being delivered to the fuel control, the plots that can be produced when using the inputs $W_f/P_b$, $W_f$ or $P_b$ versus N are performance charts of overall fuel control performance for steady state operation, acceleration, deceleration, idle droop line characteristics, military power droop line characteristics, start characteristics and stop characteristics.

If it is desired to plot fuel flow $W_f$, engine speed N, or burner pressure $P_b$ against time to determine whether the desired acceleration performance is being obtained, mode selector switch 48 is turned to the position wherein either of the signals $W_f$, N or P is caused to appear on line 54 while no signal is delivered from mode selector switch 48 to line 56. The proper switch on recording unit 64 is then actuated to put recorder unit 64 in its time mode of operation. With mode selector switch 48 thus positioned, and with recorder 64 in its TIME mode, the recorder is actuated by a signal from control 68, and the charts 72 thus produced will indicate whether desired acceleration characteristics are being obtained.

Referring now to FIGURE 4, a chart is shown having representative plots of fuel control performance which can be obtained with the present invention. The data shown in the chart in FIGURE 4 is a plot of ratio units $W_f/P_b$ versus engine speed N. When the engine is started with the power lever in the "idle" position, the start schedule proceeds along line $a$ and then along the governor idle droop line $b$ to the point of intersection between idle droop line $b$ and the engine steady state line $c$.

On engine startup, the starter is engaged until the engine is cranked to a specified speed without any fuel flow. Ignition then takes place when fuel is injected, and the engine begins to accelerate. The starter is then cut out and the engine comes up to idle. Since no fuel is injected until the engine is going at a specified speed, there are initially no ratio units, and thus the startup curve sensed by the monitoring device will be like line $a$. There are quite a few instabilities during startup before starter cutout, and these instabilities show up as nonrepeatable data during the startup.

When the power lever is moved to the "military" position, a record would be obtained of the control operation along transition line $d$ from steady state line $c$ to acceleration line $e$, and thence along acceleration limit line $e$ up to military droop line $f$, and then along governor military droop line $f$ back to the intersection between military droop line $f$ and engine steady state line $c$. The dashed portion $g$ of the acceleration line would be traversed if the engine were started with the power lever set at "military."

When the power lever is moved back to "idle," fuel flow is decreased along transition line $h$ to a minimum ratio line $i$ until engine speed decreases sufficiently for the fuel control governor to increase ratio units, and hence fuel flow, in accordance with governor idle droop line $j$.

Information on steady state line $c$ is obtained by starting from idle, advancing the power lever in a small increment, waiting a short period of time for the acceleration transition to occur to assume establishment of a new steady state operating point, and then plotting the point. This procedure is repeated a number of times all the way up to "military." The series of points constitute the steady state line $c$ or operating line of the engine.

The data indicated in FIGURE 4 is data that will be obtained if the fuel control is functioning properly. However, if the control is not functioning properly the charts obtained would differ from the standard data, so that the area of control malfunction could be pinpointed by comparison with standard data and charts. On the other hand, if the control is functioning properly, then other areas of engine operation, such as bleed valves, exhaust area nozzle control etc., can be cycled and their effects on fuel control performance recorded for comparison with standard data to determine whether these other systems are functioning properly.

The present invention also incorporates apparatus to permit operation and dwelling of fuel control on the acceleration limit line or on the deceleration limit line without any increase or decrease in actual engine speed during the dwell to provide the capability of detailed analysis of the acceleration and deceleration lines while maintaining a constant engine speed. This dwelling operation on the acceleration and deceleration schedules is accomplished through the use of a false burner pressure signal generated through a gas supply 74 and a suitacase type control unit 76.

The false burner pressure signal unit is shown in more detail in FIGURE 3. A pressurized gas supply such as a nitrogen bottle 74 is connected to flow through a variable regulator 78 in control unit 76 where the pressure is adjusted to a level for a desired pressure level in the burner section of the engine, the pressure level at the output end of regulator 78 being indicated on gauge 80.

In order to employ the false burner pressure signal generated at control unit 76, the usual pressure sensing line from the engine burner is disconnected from the fuel control, and pressure line 82 is connected to the fuel control in its place so that the pressure set at the regulator 78 is then delivered via line 82 to the fuel control in lieu of the actual signal of burner pressure. The pressure in line 82 thus constitutes an artificial or false burner pressure signal.

With a false burner pressure signal thus being delivered to the fuel control, the fuel control can be made to dwell for any desired length of time on the acceleration or deceleration schedule rather than merely quickly traversing the acceleration or deceleration schedule and then returning along a droop line to a steady state level. When the throttle level is advanced to call for engine acceleration, there is a small initial increase in fuel flow as ratio units are increased from the steady state line to the acceleration line. The increased fuel flow would ordinarily cause an increase in burner pressure, and the fuel control would normally function to allow further increases in fuel flow and increases in engine speed as burner pressure increased. However, by using a false burner pressure signal through the insertion of a selected pressure level, the normal results of increased fuel flow and increased engine speed are not obtained because the fuel control does not receive the usual signal of increased burner pressure corresponding to an increase in fuel flow. Thus, the operation of the control is shifted from the steady state line to the acceleration line and remains at one place on the acceleration line rather than traversing along the acceleration line in accordance with the requested acceleration.

By increasing the level of the false burner pressure signal delivered via line 82 when the control is dwelling on the acceleration line, the control can be made to respond to allow an increased fuel flow so that operation of the fuel control can be made to move up along acceleration line $e$ at a controlled increase in fuel flow and at an increased engine speed determined solely by the selected change in the level of the false burner pressure signal. Conversely, by reducing the false burner pressure signal, a traversal can be had downwardly along acceleration line $e$. The point of most important concern is that the fuel control can be operated in the acceleration regime and be made to move to and sit or dwell at any selected point on the acceleration line while maintaining a constant speed for any desired length of time for the dwell.

Similarly, the control can be operated to dwell on the deceleration line by retarding the throttle lever setting from an advanced setting to drive the control to the minimum ratio line $i$, and by then reducing the false burner pressure signal to selectively move along the minimum ratio line toward the idle droop line. Of course, the traversal of the minimum ratio line may also be accomplished in the reverse direction by selected increases in false burner pressure signal.

Regardless of whether the false burner pressure signal is used to operate the fuel control in the acceleration regime or in the deceleration regime, the initial level of the false burner pressure signal is always adjusted to be equal to the actual burner pressure signal at the time the transition is made from the actual burner pressure signal to the false burner pressure signal in order to avoid the fuel control responding to change fuel flow as it would if it sensed a change in burner pressure level.

It will be understood that the embodiment of the invention disclosed herein has been directed to a fuel control system in which the control governs on the basis of ratio units rather than just fuel flow. Thus, plots based on ratio units would be of significance only with respect to a control which governs on the basis of ratio units. However, the invention can be applied directly to other types of fuel controls for plots not involving ratio units.

Appropriate modifications can be made within the scope of the invention to obtain any other desired information from fuel controls which do not govern on the basis of ratio units.

While a preferred embodiment has been shown and described, various modifications and substitutions may be made without departing from the spirit and scope of this invention. Accordingly, it is to be understood that this invention has been described by way of illustration rather than limitation.

What is claimed is:

1. Monitoring apparatus for monitoring a performance of a gas turbine engine fuel control comprising:
   a first plurality of sensing means including at least:
      first means for sensing a first parameter of operation of a gas turbine engine and generating a first signal commensurate with said first parameter, said first parameter varying in response to changes in fuel control setting of the gas turbine engine;
      second means for sensing a second parameter of operation of a gas turbine engine and generating a second signal commensurate with said second parameter, said second parameter varying in response to changes in fuel control setting of the gas turbine engine; and
      third means for sensing a third parameter of operation of a gas turbine engine and generating a third signal commensurate with said third parameter, said third parameter varying in response to changes in fuel control setting of the gas turbine engine;
   means for generating a time signal;
   recording means for producing a plot in accordance with inputs to said recording means; and
   selector means connected to receive said first, second and third signals commensurate with engine parameters for selecting inputs to said recording means from said first, second and third signals and said time signal, said selector means being connected to supply either of said first, second or third signals as one input to said recording means, and said selector means also being connected to supply said first signal or said time signal as another input to said recording means, said recording means producing a plot of fuel control performance commensurate with said selected inputs thereto.

2. Monitoring apparatus for monitoring the performance of a gas turbine engine fuel control as in claim 1 wherein said first parameter is engine speed and said second parameter is fuel flow to the engine.

3. Monitoring apparatus for monitoring the performance of a gas turbine engine fuel control as in claim 1 wherein said first parameter is engine speed and said second parameter is pressure in the burner section of the engine.

4. Monitoring apparatus for monitoring the performance of a gas turbine engine fuel control as in claim 1 including:
   third means for sensing a third parameter of operation of a gas turbine engine and generating a third signal commensurate with said third parameter, said third parameter varying in response to changes in fuel control setting of the gas turbine engine;
   divider means connected to receive two of said first, second and third signals and to generate a fourth signal commensurate with a quotient of said two signals received by said divider, said divider means being connected to deliver said fourth signal to said selector means; and
   said selector means including means for selecting two of said first, second, third and fourth signals as said selected inputs to said recording means.

5. Monitoring apparatus for monitoring the performance of a gas turbine engine fuel control comprising:
   a plurality of sensing means including at least:
      first means for sensing the operating parameter of engine speed of a gas turbine engine and generating a first signal commensurate with said engine speed, said engine speed varying in response to changes in fuel control setting of the gas turbine engine,
      second means for sensing the operating parameter of fuel flow to a gas turbine engine and generating a second signal commensurate with said fuel flow, said fuel flow varying in response to changes in fuel control setting of the gas turbine engine,
      third means for sensing the operating parameter of pressure in the burner section of a gas turbine engine and generating a third signal commensurate with said burner pressure, said burner pressure varying in response to changes in fuel control setting of the gas turbine engine;
   divider means connected to receive said second and third signals to generate a fourth signal commensurate with a quotient of said fuel flow and burner pressure;
   recording means for producing a plot in accordance with inputs to said recording means;
   selector means connected to receive said first, second, third and fourth signals for selecting inputs to said recording means from said first, second, third and fourth signals;
   said selector means including means for selecting two of said first, second, third and fourth signals as said selected inputs to said recording means; and
   said selector means being connected to supply said selected inputs to said recording means, said recording means producing a plot of fuel control performance commensurate with said selected inputs to said recording means.

6. Monitoring apparatus for monitoring the performance of a gas turbine engine fuel control comprising:
   a plurality of sensing means including at least:
      first means for sensing the operating parameter of engine speed of a gas turbine engine and generating a first signal commensurate with said engine speed, said engine speed varying in response to changes in fuel control setting of the gas turbine engine;

second means for sensing the operating parameter of fuel flow to the engine of a gas turbine engine and generating a second signal commensurate with said fuel flow, said fuel flow varying in response to changes in fuel control setting of the gas turbine engine;

third means for sensing the operating parameter of pressure in the burner section of the engine of a gas turbine engine and generating a third signal commensurate with said burner pressure, said burner pressure varying in response to changes in fuel control setting of the gas turbine engine;

divider means connected to receive said second and third signals to generate a fourth signal commensurate with a quotient of said fuel flow and burner pressure;

recording means for producing a plot in accordance with inputs to said recording means;

selector means, connected to receive said first, second, third and fourth signals, for selecting inputs to said recording means from said first, second, third and fourth signals;

said selector means including means for selecting two of said first, second, third and fourth signals as said selected inputs to said recording means; and said selector means being connected to supply said selected inputs to said recording means, said recording means producing a plot of fuel control performance commensurate with said selected inputs to said recording means.

7. Monitoring apparatus for monitoring the performance of a gas turbine engine fuel control as in claim 6 wherein:

one of said selected inputs to said recording means is said first signal; and wherein:

the other of said selected inputs to said recording means is one of said second, third and fourth signals.

8. Monitoring apparatus for monitoring the performance of a gas turbine engine fuel control including:

first means for sensing the speed of a gas turbine engine and generating a first signal commensurate with that speed;

second means for sensing fuel flow to a gas turbine engine and generating a second signal commensurate with that fuel flow;

means for generating an artificial level of pressure in the burner section of a gas turbine engine;

third means for sensing said artificial level of pressure in the burner section and generating a third signal commensurate with that pressure;

divider means connected to receive said second and third signals and generate a fourth signal commensurate with the ratio of said fuel flow to said artificial level of burner pressure;

recording means for producing a plot of fuel control performance in accordance with inputs to said recording means; and means for delivering said first signal and said fourth signal to said recording means to produce a plot of acceleration or deceleration characteristics of the gas turbine engine.

9. Monitoring apparatus for a gas turbine engine as in claim 8 wherein said means for generating a third signal includes means for delivering an auxiliary pressure signal to said third sensing means.

10. The method of monitoring the performance of a gas turbine engine fuel control including the steps of:

sensing a first parameter of operation of a gas turbine engine and generating a first signal commensurate with said first parameter, said first parameter varying in response to changes in fuel control setting of the gas turbine engine;

sensing a second parameter of operation of a gas turbine engine and generating a second signal commensurate with said second parameter, said second parameter varying in response to changes in fuel control setting of the gas turbine engine; and delivering said first and second signals as inputs to said recording means to produce a plot of fuel control performance commensurate with said inputs.

11. The method of monitoring the performance of a gas turbine engine fuel control as in claim 10 including the steps of:

sensing a third parameter of operation of a gas turbine engine and generating a third signal commensurate with said third parameter, said third parameter varying in response to changes in fuel control setting of the gas turbine engine;

delivering said first, second, and third signals to selector means; and selecting two of said first, second and third signals in said selector means as selected inputs to said recording means.

12. The method of monitoring the performance of a gas turbine engine fuel control as in claim 10 including:

sensing a third parameter of operation of a gas turbine engine and generating a third signal commensurate with said third parameter, said third parameter varying in response to changes in fuel control setting of the gas turbine engine;

dividing two of said first, second and third signals; generating a fourth signal commensurate with a quotient of said two divided signals;

delivering said fourth signal to said selector means; and selecting two of said first, second, third and fourth signals in said selector means as said selected inputs to said recording means.

13. The method of monitoring the performance of a gas turbine engine fuel control as in claim 12 wherein:

said first parameter is engine speed, said second parameter is fuel flow to the engine, said third parameter is pressure in the burner section of the engine; and wherein said fourth signal is a quotient of said second and third parameters.

14. Monitoring apparatus for monitoring the performance of a gas turbine engine fuel control comprising:

a plurality of sensing means including at least:

first means for sensing the parameter of operation of a gas turbine engine of engine speed and generating a first signal commensurate with engine speed, said engine speed varying in response to changes in fuel control setting of the gas turbine engine;

second means for sensing the parameter of operation of a gas turbine engine of fuel flow to the engine and generating a second signal commensurate with said fuel flow, said fuel flow varying in response to changes in fuel control setting of the gas turbine engine; and third means for sensing the parameter of operation of a gas turbine engine of burner pressure in the burner section of the engine and generating a third signal commensurate with said burner pressure, said burner pressure varying in response to changes in fuel control setting of the gas turbine engine;

recording means for producing a plot in accordance with inputs to said recording means; and means connected to said recording means to supply a ratio of said second signal to said third signal as one input to said recording means and to supply said third signal as another input to said recording means to generate a plot of the ratio of fuel flow to burner pressure against engine speed, said plot being a plot of fuel control performance commensurate with the inputs to said recording means, and said plot being a direct recording of changes in the operating parameters of the gas turbine engine in response to changes in setting of the fuel control which directly affect control operation.

References Cited

UNITED STATES PATENTS

| | | | |
|---|---|---|---|
| 3,025,670 | 3/1962 | Russ | 73—117.3 X |
| 3,300,785 | 1/1967 | Richardson et al. | 346—17 |
| 3,303,509 | 2/1967 | Smith | 346—34 |

OTHER REFERENCES

Burdett, R. D. et al.: Jet Engine Testing, from Instruments and Automation, vol. 27, August 1954, pp. 1294 and 1295.

RICHARD C. QUEISSER, *Primary Examiner.*

JERRY W. MYRACLE, *Assistant Examiner.*

U.S. Cl. X.R.

346—4

PO-1050
(5/69)

UNITED STATES PATENT OFFICE
CERTIFICATE OF CORRECTION

Patent No. 3,443,428          Dated  May 13, 1969

Inventor(s)   W. F. Carlin III, et al

It is certified that error appears in the above-identified patent and that said Letters Patent are hereby corrected as shown below:

Delete claim 6 in its entirety and substitute therefor the following claim:
CLAIM 6: Monitoring apparatus for monitoring the performance of a gas turbine engine fuel control as in claim 5 wherein:
said fourth signal is a quotient of said second signal to said third signal.

SIGNED AND
SEALED
JAN 27 1970

(SEAL)
Attest:

Edward M. Fletcher, Jr.
Attesting Officer

WILLIAM E. SCHUYLER, JR.
Commissioner of Patents